July 13, 1965  S. V. LAZECKI  3,195,120
MULTIPLE POLE PAIR RESOLVER MARKER GENERATOR
Filed Feb. 12, 1963  3 Sheets-Sheet 1

INVENTOR.
STANISLAW V. LAZECKI
BY
Shenier & O'Connor
ATTORNEYS

July 13, 1965 S. V. LAZECKI 3,195,120
MULTIPLE POLE PAIR RESOLVER MARKER GENERATOR
Filed Feb. 12, 1963 3 Sheets-Sheet 2

INVENTOR.
STANISLAW V. LAZECKI
BY
Shenier & O'Connor
ATTORNEYS

July 13, 1965   S. V. LAZECKI   3,195,120
MULTIPLE POLE PAIR RESOLVER MARKER GENERATOR
Filed Feb. 12, 1963   3 Sheets-Sheet 3
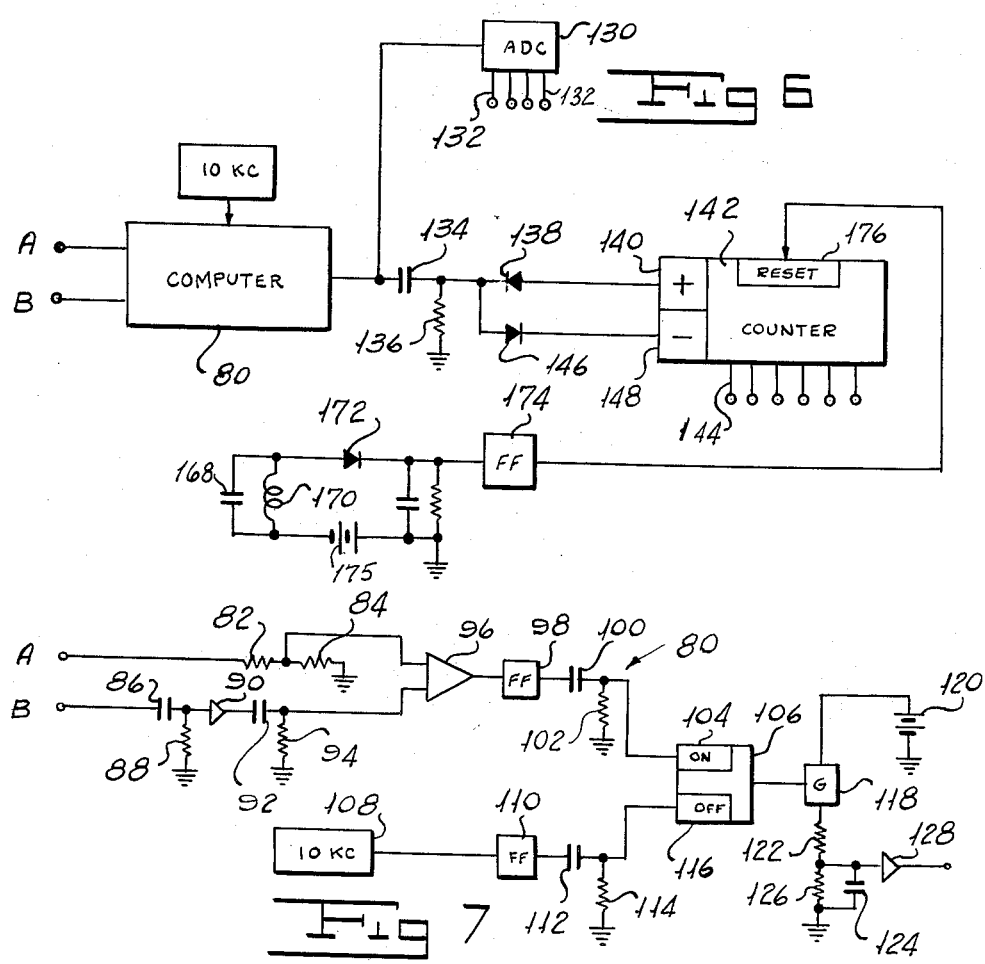
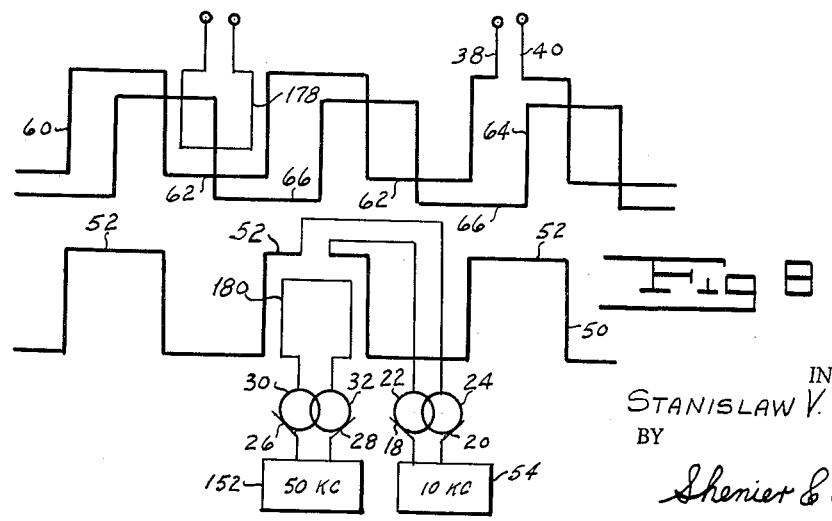
INVENTOR.
STANISLAW V. LAZECKI
BY
Shenier & O'Connor
ATTORNEYS _United States Patent Office_ 3,195,120
Patented July 13, 1965

3,195,120
MULTIPLE POLE PAIR RESOLVER MARKER GENERATOR
Stanislaw V. Lazecki, Stamford, Conn., assignor to United Aircraft Corporation, East Hartford, Conn., a corporation of Delaware
Filed Feb. 12, 1963, Ser. No. 257,919
5 Claims. (Cl. 340—196)

My invention relates to a multiple pole pair resolver and more particularly to a multiple pole pair resolver marker generator which is built into the resolver.

In the prior art multiple pole pair resolvers are employed to provide a readout of the angular position of a shaft. Most of these installations have fine and coarse readout sections. The fine readout section includes a plurality of pole pairs and its output goes through a predetermined number of electrical cycles for each revolution of the shaft in accordance with the number of pole pairs provided. The coarse readout section of the device goes through only a single electrical cycle for each revolution of the device. These two outputs can be used to provide coarse and fine representations of the angular position of a shaft.

In order to simplify systems of the type described above, it has been suggested that the coarse readout data be obtained by counting the number of complete electrical cycles through which the fine readout system has passed in arriving at a particular position. While counting cycles in this manner will provide a measure of the angular position of the input shaft it is essential that the counting commence from a predetermined reference position of the shaft which may, for example, be zero degrees or any arbitrarily chosen shaft angle. No satisfactory means has been found in the prior art for indicating this starting or reference position in a simple and expeditious manner.

I have invented a multiple pole pair resolver marker generator which determines the reference position of the input shaft in a rapid and expeditious manner. My marker generator permits the coarse readout information to be determined from the fine readout information. My marker generator does away with the need for providing a separate and independent slow speed or coarse readout section. My marker generator is relatively simple and inexpensive for the result achieved thereby.

One object of my invention is to provide a multiple pole pair resolver marker generator for indicating the reference position of the input shaft.

Another object of my invention is to provide a multiple pole pair resolver which permits coarse angular readout information to be derived directly from the fine angular readout information.

A further object of my invention is to provide a multiple pole pair resolver marker generator which does away with the need for a low speed or coarse readout section in an angle measuring system.

A further object of my invention is to provide a multiple pole pair resolver marker generator which is simple and inexpensive to construct.

Other and further objects of my invention will be apparent from the following description.

In general my invention contemplates the provision, in a resolver having multiple pole rotor and stator windings with the rotor winding energized by a main interrogating signal, of respective single pole marker loops on the rotor and stator with the rotor loop energized by a signal of a frequency greater than the frequency of the interrogating signal. On each revolution of the rotor relative to the stator the stator marker loop puts out a marker pulse which indicates the position at which the count for the coarse readout begins.

In the accompanying drawings which form part of the instant specification and which are to be read in conjunction therewith and in which like reference numerals are used to indicate like parts in the various views:

FIGURE 6 is a schematic view illustrating the manner in which the fine readout information is used to obtain the coarse angular information.

FIGURE 7 is a schematic view illustrating one system for obtaining a fine readout signal from the outputs of the stator windings of the resolver shown in FIGURE 2.

FIGURE 8 is a fragmentary schematic view illustrating an alternate form of my multiple pole pair resolver marker generator.

Figure 1:
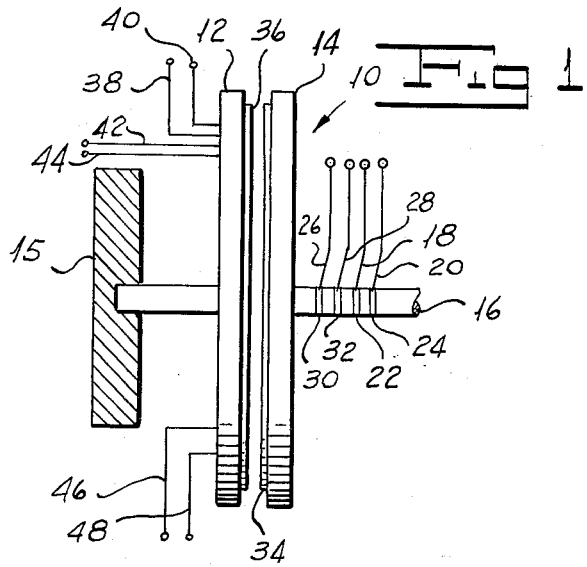
FIGURE 1 is a schematic view of a multiple pole pair resolver provided with my marker generator.

Referring now to FIGURE 1 of the drawings a resolver indicated generally by the reference character 10 which is provided with my marker generator includes a stator 12 secured to a fixed support 15 and a rotor 14 carried by a shaft 16 the angular position of which is to be measured. Respective brushes 18 and 20 in engagement with slip rings 22 and 24 are adapted to carry the main interrogating signal to the rotor winding to be described hereinafter. Brushes 26 and 28 engage slip rings 30 and 32 to carry the marker pulse input signal to the rotor marker pulse loop to be described hereinafter. Rotor 14 carries a pattern of conductive material 34 which provides the rotor winding and the rotor marker generator loop to described hereinafter. The rotor 14 may itself be formed of insulating material or alternatively it may be made of conductive material covered with a film of insulating material over which the conductive material 34 is applied.

The stator 12 which may itself be insulating material or which may be conductive and have a film of insulating material on its face carries a pattern of conductive material 36 providing the stator output windings as well as the stator marker loop to be described hereinafter. Respective conductors 38 and 40 carry the output of one of the stator windings to the external circuit. A second pair of conductors 42 and 44 carry the output of the other stator winding to the external circuit. Conductors 46 and 48 carry the stator marker pulse loop output to the external circuit.

Figure 2:
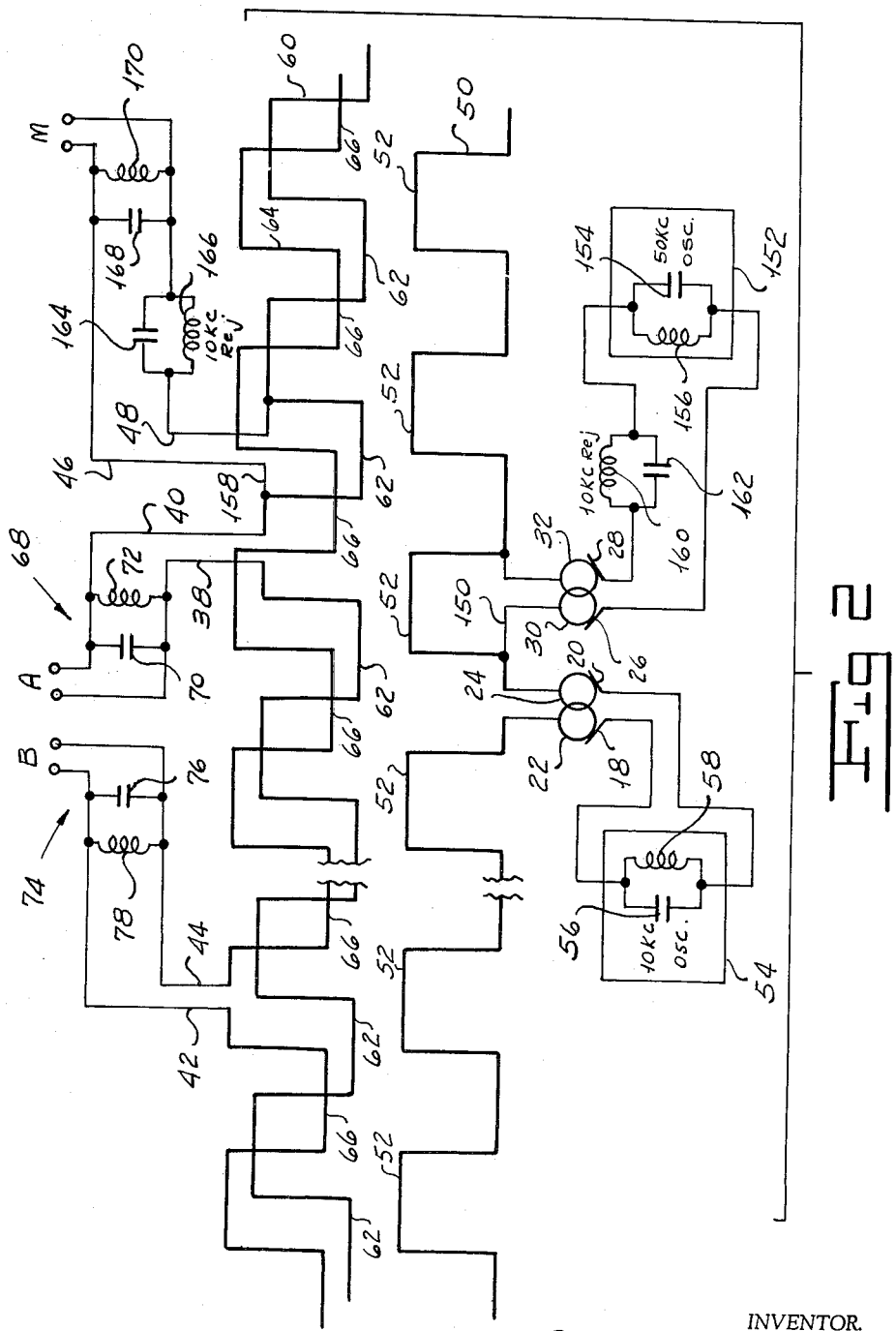
FIGURE 2 is a schematic view of my multiple pole pair marker generator and a portion of its associated circuitry.

Referring now to FIGURE 2 the conductive material 34 of the rotor 14 forms a pattern of conductive material providing a winding 50 having a plurality of connected poles 52. The brushes 18 and 20 and slip rings 22 and 24 couple the interrogating signal from an oscillator 54 to the winding having the poles 52. For example, I arrange a tank circuit including the capacitor 56 and inductor 58 to cause the oscillator 54 to put out an interrogating signal at a frequency of 10 kc. for example.

The conductive material 36 on the stator 12 forms a pattern providing a first winding 60 having a number of poles 62 and a second winding 64 having a plurality of poles 66. The conductors 38 and 40 carry the output of the winding 60 to a 10 kc. pass filter indicated generally by the reference character 68 made up of a capacitor 70 and an inductor 72. Similarly the conductors 42 and 44 carry the output of winding 64 to a 10 kc. pass filter indicated generally by the reference character 74 and including a capacitor 76 and an inductor 78.

Figure 3:
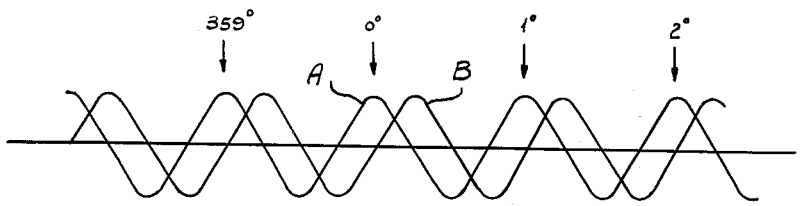
FIGURE 3 is a diagram illustrating the normal outputs of the stator windings of the resolver shown in FIGURE 2.

As the shaft 16 rotates winding 50 moves relative to both windings 60 and 64 and there are induced in the latter windings signals the magnitudes of which vary sinusoidally a number of times for each complete revolution depending upon the number of pole pairs which are employed. For purposes of clarity I have arbitrarily chosen to provide 360 pole pairs for the rotor winding 50 with respect to each of the stator windings 60 and 64. With this arrangement it will readily be apparent that the output of each of the stator windings varies through a complete electrical cycle for each degree of relative rotation of stator 12 and rotor 14. In FIGURE 3 I have indicated the respective outputs of windings 60 and 64 as A and B and have shown an arbitrary 0° relative position as being that position at which signal A is a maximum and signal B is passing through zero in the plus direction.

In order to obtain the required fine output angular representation it is necessary to feed the signals A and B to a computer indicated schematically in FIGURE 6 by the box 80 and indicated generally in FIGURE 7 by the reference character 80. It will be appreciated that I have available two electrical signals A and B which are displaced 90° in space phase. It will be apparent also that the two signals A and B have the same maximum amplitude. Now if I take two signals which are displaced 90° both in space phase and in time phase and of the same maximum amplitude and add them to produce a resultant, this resultant has a phase shift in time phase relationship to the reference signal which is equal to the space phase relationship of the resultant signal to the reference signal. This phase relationship can be employed to generate a signal representing the relative angular displacement of the rotor and stator over each degree of relative rotation.

I apply the A signal output from winding 60 to a voltage divider including resistors 82 and 84 of equal value to produce a signal having half the magnitude of the A signal at the common terminal of the resistors. I apply the B signal from winding 64 to a first phase shifting circuit including a series capacitor 86 and a resistor 88 connected to ground to provide 45° phase shift of the signal. An amplifier 90 applies the phase-shifted signal to a second phase shifter including a series capacitor 92 and a resistor 94 connected to ground to produce a signal across resistor 94 which signal leads the A signal by 90°. Owing to the inherent loss in the phase shifter, the signal across resistor 94 is about half the magnitude of the input signal. It is for this reason that we divide the A input in half by the divider including resistors 82 and 84. I apply both the divided A signal and the phase-shifted and divided B signal to a summing amplifier 96 which produces as an output the resultant signal referred to above. I apply the output of the summing amplifier 96 to a flip-flop circuit 98 to turn the flip-flop on whenever the signal output from amplifier 96 is positive.

A differentiating circuit including a series capacitor 100 and a grounded resistor 102 produces a positive pulse from the output of the flip-flop whenever the output of amplifier 96 is going positive. This pulse is applied to the on input terminal 104 of a flip-flop 106 to turn the flip-flop 106 on. I connect the output of a reference signal source 108 which may be the oscillator 54, for example, to the input of a flip-flop 110 to turn the flip-flop on whenever the reference signal is positive. A differentiating circuit including a capacitor 112 and a grounded resistor 114 produces a sharp positive pulse whenever the signal from the source 108 is going positive. This pulse is applied to the off input section 116 of flip-flop 106.

From the circuitry just described, it will be apparent that if the resultant signal goes from negative to positive shortly before the reference signal goes from negative to positive, the flip-flop 106 will be turned on for a relatively short period of time. On the other hand, if the reference signal goes positive before the resultant signal then the flip-flop will be turned on for a relatively long period of time. Thus the output of the flip-flop 106 is a measure of the phase relationship between the reference signal and the resultant signal.

I connect the ouput of flip-flop 106 to the control terminal of a gating circuit 118 adapted to couple a source of potential such as a battery 120 to a series circuit including a resistor 122 and a capacitor 124 to develop an average voltage across the capacitor which is a measure of the relative angular displacement between the rotor 14 and the stator 12 over the interval of a degree. I connect a discharging resistor 126 across capacitor 124. An amplifier 128 provides the required fine readout of the relative angular position of rotor 14 and stator 12 which I may, if desired, apply to an analogue-to-digital converter 130 to produce a digital output representation of the fine position signal on channels 132.

Figure 4:
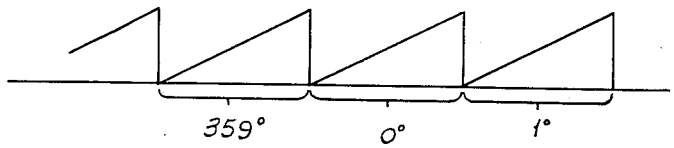
FIGURE 4 is a diagram illustrating the fine readout angular information over a number of cycles.

Referring now to FIGURES 4 and 6 it will be apparent that the computer 80 produces an output signal of the general form shown in FIGURE 4 for representing the relative angular position between rotor 14 and stator 12 over the interval of a degree. As is pointed out hereinabove, in my multiple pole pair resolver I count the number of variations in the signal shown in FIGURE 4 to provide the coarse output information of my resolver. I apply this signal to a differentiating circuit including a series capacitor 134 and a grounded resistor 136. This latter circuit produces a negative-going pulse each time the signal input goes rapidly from a relatively high value to relatively low value as when the relative rotation between rotor 14 and stator 12 is such that the angular displacement is increasing from a lower number to a higher number with reference to FIGURE 4. Conversely if the direction of rotation is reversed, the fine readout changes rapidly from a low value to a high value to produce a sharp positive-going pulse at the differentiating circuit including the capacitor 134 and resistor 136. A diode 138 couples negative-going pulses to the up-count actuating section 140 of a counter 142 to cause the counter output on channels 144 to increase by one in response to a negative pulse from the differentiating circuit. Diode 138 blocks positive-going pulses. A second diode 146 applies positive-going pulses from the differentiating circuit including capacitor 134 to the down-count input section 148 of counter 142 to cause the output of the counter to decrease by one in response to a positive-going pulse. From the structure just described, it will readily be apparent that as the shaft 16 turns in one direction or the other the count of counter 142 increases or decreases by one depending upon the direction of rotation for each full cycle of the wave form B. In the particular example I have chosen in which there are 360 pole pairs, the count changes by one for each degree of rotation.

In order for the system described thus far to provide a sensible output, it is necessary that information be made available to determine where the count begun. That is, there must be provided some means for indicating a reference point with respect to which the count was made. I have invented a built-in reference pulse generating means which indicates the point in a revolution of shaft 16 with respect to the stator 12 at which the count begun. I connect the slip rings 30 and 32 to one of the poles 52 to form a reference marker loop 150 on the rotor 14. I connect an oscillator 152 to the brushes 26 and 28 to energize the reference marker 150. I so choose the capacitor 154 and inductor 156 of the oscillator 152 as to provide an output frequency which is much larger than the frequency of the main interrogating signal provided by oscillator 54. For example, where the frequency of the output signal of oscillator 54 is 10 kc., the frequency of oscillation of oscillator 152 may be 50 kc.

Figure 5:
FIGURE 5 is a diagram illustrating the marker pulse produced by my multiple pole pair resolver marker generator.

It is desirable for the best operation of my system that the marker pulse be produced at a time at which the B signal is zero and in the middle of the 0° count shown in FIGURE 3. For this reason I derive the marker pulse from the winding 60 which provides the A output signal which at the chosen time is a maximum. I connect conductors 46 and 48 to the winding 60 to form a stator marker pulse loop 158. It will readily be apparent that when the rotor marker pulse loop 150 is adjacent the stator marker pulse loop 158 in the course of a revolution of shaft 16 then a signal such as is shown in FIGURE 5 is induced in loop 158.

In order to prevent the output signal of the 10 kc. oscillator 54 from being shorted through the 50 kc. oscillator 152, I dispose a 10 kc. reject filter including an inductor 160 and a capacitor 162 in the line connecting oscillator 152 to brush 28.

Similarly in order to prevent false marker pulse signals from being passed to the output circuit, I connect the conductor 48 to a 10 kc. reject filter including a capacitor 164 and an inductor 166. A 50 kc. pass filter including capacitor 168 and inductor 170 is connected between conductor 46 and the output of the 10 kc. reject filter. From the structure just described, it will be clear that once during each revolution there appears across the inductor 170 a marker pulse. A diode 172 couples this marker pulse to the input terminal of a flip-flop circuit 174 to turn the flip-flop on. A bias battery 175 provides a bias for holding the flip-flop off until the marker pulse reaches a predetermined level indicated by the broken line in FIGURE 5. When the pulse reaches this level then it applies a signal to the reset section 176 of counter 142 to reset the counter. It will be understood that I need only employ a single set of slip rings and brushes in the form of my invention shown in FIGURE 2 if desired.

Referring now to FIGURE 8 I have shown a fragmentary, schematic view illustrating an alternate form of my resolver marker generator in which I have indicated like parts to those shown in FIGURE 2 by the same reference characters. In this form of my invention rather than employing a marker pulse rotor generator loop 150 which is conductively connected to the rotor winding 50 I dispose a loop 180 within one of the poles 52 of the winding 50. I energize this loop from slip rings 30 and 32. Further in the form of my invention shown in FIGURE 8 I provide a stator marker pulse loop 178 disposed within a pole 62 of the winding 50. In all other respects this form of my invention is similar to that shown in FIGURE 2.

In operation of my resolver marker generator as the rotor winding 50 moves relative to the stator windings 60 and 64 the windings 60 and 64 produce output signals A and B such as are shown in FIGURE 3. I feed these signals to the computer 80 to cause the computer to generate an output such as is illustrated in FIGURE 4 to give the fine angular position information required of my device. This fine information is applied to the differentiating circuit including capacitor 134 and resistor 136 to actuate the counter 142 to cause the counter to count up or down depending upon the direction or relative rotation of the rotor and stator to indicate the coarse angular position of the shaft 16, for example. At the center of the 0° position the signal from loop 158 passes to the flip-flop 174 to provide a signal which actuates the reset section 176 of counter 142 to cause the counter output to return to 0. When this has been achieved the counter can again begin to carry the number of cycles of the fine output to provide the coarse output information.

It will be seen that I have accomplished the objects of my invention. I have provided a resolver marker generator which permits the coarse angular position information to be obtained from the fine angular position information. My marker generator determines the reference position of the input shaft in a rapid and expeditious manner. It does away with the need for providing a separate and independent slow speed or coarse information section. It is simple and inexpensive for the results achieved thereby.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A device for producing a signal indicating the relative position of a pair of relatively movable members including in combination an input winding carried by one of said members, an output winding carried by the other of said members, a source of a signal of a certain frequency, means for energizing said input winding from said source to cause said output winding to produce a signal having a predetermined number of cyclic variations for a predetermined movement of said members relative to each other, a marker input loop carried by one of said members, a marker output loop carried by the other of said members, a second source of a frequency different from said certain frequency and means for energizing said input loop from said second source to cause said output loop to produce a marker signal at a predetermined relative position of said members.

2. A device for producing a signal indicating the relative position of a pair of relatively movable members including in combination a first winding carried by one of said members, a second winding carried by the other of said members, said first and second windings being magnetically coupled, means for energizing the first winding to cause the second winding to produce an output signal having a predetermined number of cyclic variations for a predetermined movement of said members relative to each other, a marker input winding carried by one of said members, a marker output winding carried by the other of said members, means for energizing said marker input winding to cause said marker output winding to produce a marker signal at a predetermined relative position of said members, said marker input and output windings being magnetically coupled to each other and to each of the first and second windings and means for distinguishing between said output and marker signals.

3. A device for producing a signal indicating the relative position of a pair of relatively movable members including in combination a first winding carried by one of said members, a second winding carried by the other of said members, said first and second windings being magnetically coupled, means for energizing the first winding to cause the second winding to produce an output signal having a predetermined number of cyclic variations for a predetermined movement of said members relative to each other, a marker input winding carried by one of said members, said marker input winding being conductively associated with said first winding, a marker output winding carried by the other of said members, said marker output winding being conductively associated with said second winding, means for energizing said marker input winding to cause said marker output winding to produce a marker signal at a predetermined relative position of said members, said marker input and output windings being magnetically coupled to each other and to each of the first and second windings and means for distinguishing between said output and marker signals.

4. A device for producing a signal indicating the relative position of a pair of relatively movable members including in combination a first winding carried by one of said members, a second winding carried by the other of said members, said first and second windings being magnetically coupled, means for energizing the first winding to cause the second winding to produce an output signal having a predetermined number of cyclic variations for a predetermined movement of said members relative to each other, a marker input winding carried by one of said members, said marker input winding being conductively isolated from said first winding, a marker output winding carried by the other of said members, said marker output winding being conductively isolated from said second winding, means for energizing said marker input winding to cause said marker output winding to produce a marker signal at a predetermined relative position of said members, said marker input and output windings being magnetically coupled to each other and to each of the first and second windings and means for distinguishing between said output and marker signals.

5. A device for producing a signal indicating the relative position of a pair of relatively movable members including in combination an input winding carried by one of said members, an output winding carried by the other of said members, means for energizing said input winding to cause said output winding to produce a signal, said input and output windings forming a plurality of pole pairs whereby said signal has a predetermined number of cyclic variations for a predetermined movement of said members relative to each other, a marker input loop forming a pole subtending substantially the same distance as one of said pair poles, a marker output loop forming a pole carried by the other of said members, said marker output loop pole subtending a distance substantially equal to that subtended by one of said pair poles and means for energizing said marker input loop to cause said marker output loop to produce a marker signal at a predetermined relative position of said members.

References Cited by the Examiner

UNITED STATES PATENTS

| | | | |
|---|---|---|---|
| 2,590,845 | 4/52 | Curry | 340—198 |
| 2,680,241 | 6/54 | Gridley | 340—271 |
| 2,850,240 | 9/58 | Dickinson | 340—347.3 |
| 2,970,302 | 1/61 | Gridley | 340—271 |
| 2,980,900 | 4/61 | Rabin | 340—347.3 |
| 2,987,717 | 6/61 | Altonji et al. | 340—206 |
| 3,034,053 | 5/62 | Lanning et al. | 340—347.3 |
| 3,091,755 | 5/63 | Sanner et al. | 340—198 |

NEIL C. READ, *Primary Examiner.*